(12) United States Patent
Ji et al.

(10) Patent No.: US 8,837,419 B2
(45) Date of Patent: Sep. 16, 2014

(54) METHOD AND APPARATUS FOR TRANSMITTING/RECEIVING CONTROL CHANNEL IN WIRELESS COMMUNICATION SYSTEM

(71) Applicant: Samsung Electronics Co. Ltd., Suwon-si (KR)

(72) Inventors: Hyoungju Ji, Seoul (KR); Younsun Kim, Seongnam-si (KR); Joonyoung Cho, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/873,864

(22) Filed: Apr. 30, 2013

(65) Prior Publication Data

US 2013/0286967 A1    Oct. 31, 2013

Related U.S. Application Data

(60) Provisional application No. 61/640,111, filed on Apr. 30, 2012.

(30) Foreign Application Priority Data

Apr. 26, 2013  (KR) .................. 10-2013-0046497

(51) Int. Cl.
*H04W 4/00*    (2009.01)
(52) U.S. Cl.
USPC .......................................... 370/329
(58) Field of Classification Search
None
See application file for complete search history.

(56) References Cited

U.S. PATENT DOCUMENTS

| 2012/0057519 | A1  | 3/2012 | Kim et al. |          |
|--------------|-----|--------|------------|----------|
| 2012/0140717 | A1* | 6/2012 | Zhu et al. | 370/329  |
| 2012/0201318 | A1* | 8/2012 | Seo et al. | 375/260  |
| 2012/0213311 | A1* | 8/2012 | Park et al.| 375/295  |
| 2013/0044692 | A1* | 2/2013 | Nory et al.| 370/329  |

OTHER PUBLICATIONS

ZTE, 'Discussion on DMRS for enhanced PDCCH', R1-121051, 3GPP TSG RAN WG1 Meeting #68bis, Jeju, Korea, Mar. 26-30, 2012, See pp. 1-5 and figure 1.
LG Electronics Inc., 'R-PDCCH REG mapping', R1-106136, 3GPP TSG RAN WG1 Meeting #63, Jacksonville, USA, Nov. 15-19, 2010, See pp. 1-4.
Samsung, 'R-PDCCH REG/CCE mapping onto PRBs', R1-105403, 3GPP TSG RAN WG1 Meeting #63, Jacksonville, USA, Nov. 15-19, 2010, See pp. 1-4.
NTT DOCOMO, 'Resource Mapping Scheme for E-PDCCH', R1-121477, 3GPP TSG RAN WG1 Meeting #68bis, Jeju, Korea, Mar. 26-30, 2012, See pp. 1-6.

* cited by examiner

*Primary Examiner* — John Blanton
(74) *Attorney, Agent, or Firm* — Jefferson IP Law, LLP

(57) ABSTRACT

A control channel transmission/reception method and an apparatus for transmitting/receiving control channels using a resource allocation scheme applicable regardless of reference signal transmission or whether the reference signal is transmitted in distributed transmission mode or localized transmission mode are provided. The control channel transmission method includes mapping a Demodulation Reference Signal (DMRS) to Resource Elements (REs) of a Resource Block (RB) for transmitting a control channel, mapping the control channel to the REs numbered with numbers of predetermined number of Resource Element Groups (REGs) in a frequency-first ascending order cyclically, with the exception of the REs to which the DMRS is mapped, and transmitting the DMRS and the control channel.

28 Claims, 15 Drawing Sheets eREG_n and eREG_{n+4} make up a eCCE

METHOD AND APPARATUS FOR TRANSMITTING/RECEIVING CONTROL CHANNEL IN WIRELESS COMMUNICATION SYSTEM

PRIORITY

This application claims the benefit under 35 U.S.C. §119(e) of a U.S. Provisional application filed on Apr. 30, 2012 in the U.S. Patent and Trademark Office and assigned Ser. No. 61/640,111, and under 35 U.S.C. §119(a) of a Korean patent application filed on Apr. 26, 2013 in the Korean Intellectual Property Office and assigned Serial No. 10-2013-0046497, the entire disclosure of each of which is hereby incorporated by reference.

BACKGROUND OF THE INVENTION

1. Field of the Invention

The present invention relates to a control channel transmission/reception method and apparatus of a wireless communication system. More particularly, the present invention relates to a method and apparatus for transmitting/receiving control channels using a resource allocation scheme that is applicable regardless of reference signal transmission or whether the reference signal is transmitted in a distributed transmission mode or a localized transmission mode.

2. Description of the Related Art

In a Long Term Evolution (LTE) system, the control channels include a User Equipment (UE) control channel and a relay control channel. The UE control channel is a control channel using a Common Reference Signal (CRS) which is transmitted as segmented in the time domain and distributed across the entire band. A control channel (e.g., a Physical Downlink Control Channel (PDCCH)) is mapped to a plurality of Control Channel Elements (CCEs), and a CCE comprises a plurality of Resource Element Groups (REGs). The control channels are interleaved in unit of REG and multiplexed across the entire band.

The relay control channel is the control channel transmitted on a specific frequency band (e.g., a Physical Resource Block (PRB)), and supports both the CRS-based transmission scheme and a Demodulation Reference Signal (DMRS)-based transmission scheme. Similar to PDCCH transmission, the control channel multiplexing supports both the REG-based distributed transmission and a PRB-based localized transmission with the notification to the relay through higher layer signaling.

In contrast to the localized transmission which is performed using both the CRS-based transmission scheme and the DMRS-based transmission scheme, the distributed transmission is performed only in distributed transmission mode. In contrast to the CRS-based transmission in which the relay performs channel estimation and channel feedback based on CRS, the DMRS-based transmission is performed in such a way that the channel estimation is performed based on DMRS while channel feedback is performed based on the CSI-RS.

Accordingly, when the CSI-RS is transmitted in the localized transmission mode, the resource amount for control channel in a PRB reduces as much as the CSI-RS. In the distributed transmission mode, because no CSI-RS is transmitted, the control channel is transmitted on the REGs at predetermined positions of a plurality of PRBs.

The Enhanced PDCCH (E-PDCCH) is the channel designed for transmitting the control channel at a specific frequency region as the relay control channel and transmitted only with DMRS in any of the distributed and localized transmission modes. Because E-PDCCH supports the DMRS-based distributed transmission unlike the relay control channel, E-PDCCH is always required to transmit CSI-Reference Signal (RS) for E-PDCCH. Accordingly, when CSI-RS exists in a PRB, the available resource of the PRB varies depending on whether the transmission is performed in the distributed transmission mode or the localized transmission mode.

Therefore, a need exists for a resource allocation method for control channel transmission in both the distributed transmission mode and the localized transmission mode.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a resource allocation method for control channel transmission in both the distributed transmission mode and localized transmission mode.

In accordance with an aspect of the present invention, a control channel transmission method of a base station in a wireless communication system is provided. The method includes mapping a Demodulation Reference Signal (DMRS) to Resource Elements (REs) of a Resource Block (RB) for transmitting a control channel, mapping the control channel to the REs in a frequency-first ascending order cyclically with the exception of the REs to which the DMRS is mapped, and transmitting the DMRS and the control channel.

In accordance with another aspect of the present invention, a control channel reception method of a terminal in a wireless communication system is provided. The method includes determining REs to which a DMRS is mapped in a RB for transmitting a control channel, determining the REs to which the control channel is mapped in a frequency-first ascending order cyclically with the exception of the REs to which the DMRS is mapped, and receiving the DMRS and the control channel according to the determined REs.

In accordance with another aspect of the present invention, a control channel transmission apparatus of a base station in a wireless communication system is provided. The apparatus includes a transceiver which transmits and receives signals to and from a terminal, and a controller which controls mapping a DMRS to REs of a RB for transmitting a control channel, mapping the control channel to the REs in a frequency-first ascending order cyclically with the exception of the REs to which the DMRS is mapped, and transmitting the DMRS and the control channel.

In accordance with another aspect of the present invention, a control channel reception apparatus of a terminal in a wireless communication system is provided. The apparatus includes a transceiver which transmits and receives signals to and from a base station, and a controller which controls determining REs to which a DMRS is mapped in a RB for transmitting a control channel, determining the REs to which the control channel is mapped in a frequency-first ascending order cyclically with the exception of the REs to which the DMRS is mapped, and receiving the DMRS and the control channel according to the determined REs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to the Orthogonal Frequency-Division Multiplexing (OFDM)-based radio communication system, particularly the 3rd Generation Partnership Project (3GPP) Evolved Universal Terrestrial Radio Access (EUTRA)-based radio communication system, it will be understood by those skilled in the art that the present invention can be applied to other communication systems having the similar technical background and channel format, with a slight modification, without departing from the spirit and scope of the present invention.

Figure 1:
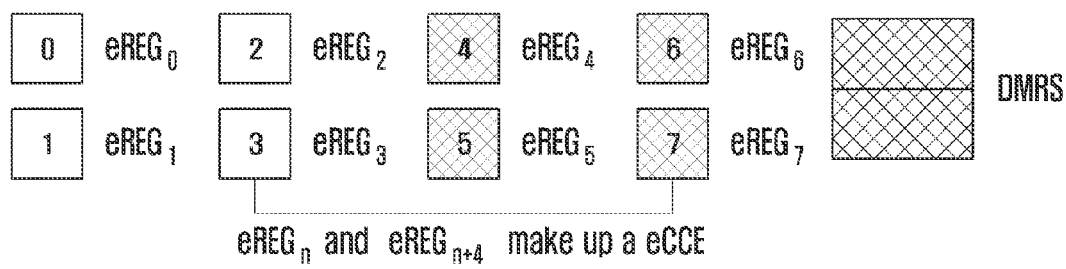
FIG. 1 is a diagram illustrating a structure of a resource block for transmitting control channel from an evolved Node B (eNB) to a User Equipment (UE) according to an exemplary embodiment of the present invention.

FIG. 1 is a diagram illustrating a structure of a resource block for transmitting control channel from an evolved Node B (eNB) to a User Equipment (UE) according to an exemplary embodiment of the present invention.

Referring to FIG. 1, the horizontal axis corresponds to a time axis, and numbers on the time axis are symbol indices. The vertical axis corresponds to a frequency axis, and numbers on the frequency axis are subcarrier indices. The control channel is mapped to the resource elements of the resource block in unit of Control Channel Element (CCE), and CCE is composed of a predetermined number of Resource Element Groups (REGs).

The control channel may be an Enhanced Physical Downlink Control Channel (E-PDCCH). In this case, the E-PDCCH is allocated a resource in a unit of an extended CCE (eCCE). An eCCE is composed of Enhanced REGs (eREGs). The numbers marked on the Resource Elements (REs) are provided to distinguish among the eREGs and thus the REs belonging to the same REG are numbered with the same number.

As illustrated in FIG. 1, when mapping the control channel to the REs of the Resource Block (RB) or the Physical Resource Block (PRB) pair, the eNB maps the control channel such that four CCEs occupy one RE on each of 12 subcarriers within the PRB for the REs remaining after mapping Demodulation Reference Signal (DMRS).

According to exemplary embodiments of the present invention such as, for example, the exemplary embodiment of the present invention of FIG. 1, the resource block may include four CCEs and, in this case, the eNB maps the four CCEs, CCE 0 to CCE 3, to the REs from the position of symbol index 0 and subcarrier index 0 in the ascending order subcarrier index alternately. When the mapping has completed to the 12 subcarrier indices for the symbol index 0 (e.g., once the mapping has completed to the 12 subcarrier indices for the symbol index 0), the mapping continues in the ascending order of the subcarriers for the next symbol index 1. Accordingly, the same CCE is mapped to every 4th RE.

According to an exemplary embodiment of the present invention, one CCE may include two REGs as shown in FIG. 1. Accordingly, 8 REGs are included in one RB, because one RB includes four CCEs. If such a scheme is applied to the resource allocation method according to an exemplary embodiment of the present invention, 8 REGs are mapped in a circular manner which increases the subcarrier index of RE for each symbol. For example, the same REG's RE appears at every 8th subcarrier for the same symbol from the viewpoint of frequency axis. However, exemplary embodiments the present invention are not limited this configuration. For example, the number of REGs constituting one CCE can be changed.

When mapping the control channel in the PRB, the same eREG is mapped to the REs at every 8th subcarrier index, incrementing the symbol index by 1 at every 12 subcarriers. Accordingly, a total of 8 eREGs are arranged in the ascending order of the subcarrier index as shown in FIG. 1.

If eREGx and eREGx+4 constitute one eCCE as shown in FIG. 1, each eCCE occupies the subcarriers at an interval of 4 REs. Although FIG. 1 is directed to the case in which an eREG consists of REs positioned at every 8 REs, the interval between two REs for eREG can be changed. For example, the same result as the exemplary embodiment of the present invention illustrated in FIG. 1 is reached if an eREG comprises REs positioned at an interval of 16 subcarriers, if the total number of eREGs is 16, and if eREGx, eREGx+2, eREGx+4, eREGx+8 constitute one eCCE.

In the typical relationship between eREG and eCCE, the eREG index used as eCCE index n is expressed as (n mod N_CCE)+j*N_CCE. N_CCE denotes the number of CCEs per PRB which is 4 the exemplary embodiment of the present invention illustrated in FIG. 1, n denotes the eCCE index, and j denotes the eREG index. In the case that one eCCE comprises 2 eREGs as shown in FIG. 1, j=0 and 1, eREG index of eCCE 0 is 0, 4, and eREG index of eCCE 1 is 1, 5.

According to exemplary embodiments of the present invention, the indices of eREGs corresponding to an eCCE are used in different PRBs (e.g., in the distributed transmission mode).

In the above-described control channel mapping procedure, the eNB considers only DMRS but does not consider Common Reference Signal (CRS) or CSI-RS. Accordingly, the REs to which CRS and CSI-RS are mapped may be punctured.

In the case of mapping the control channel as described above, each CCE can be arranged in a similar frequency distributed pattern in a PRB and, especially when existing CSI-RS and/or CRS are punctured, it is possible to maintain the punctured resource amount identically in the CCEs. Also, it is possible to configure the eREG and eCCE at the same positions regardless of the position and amount of CRS and CSI-RS.

Figure 2:
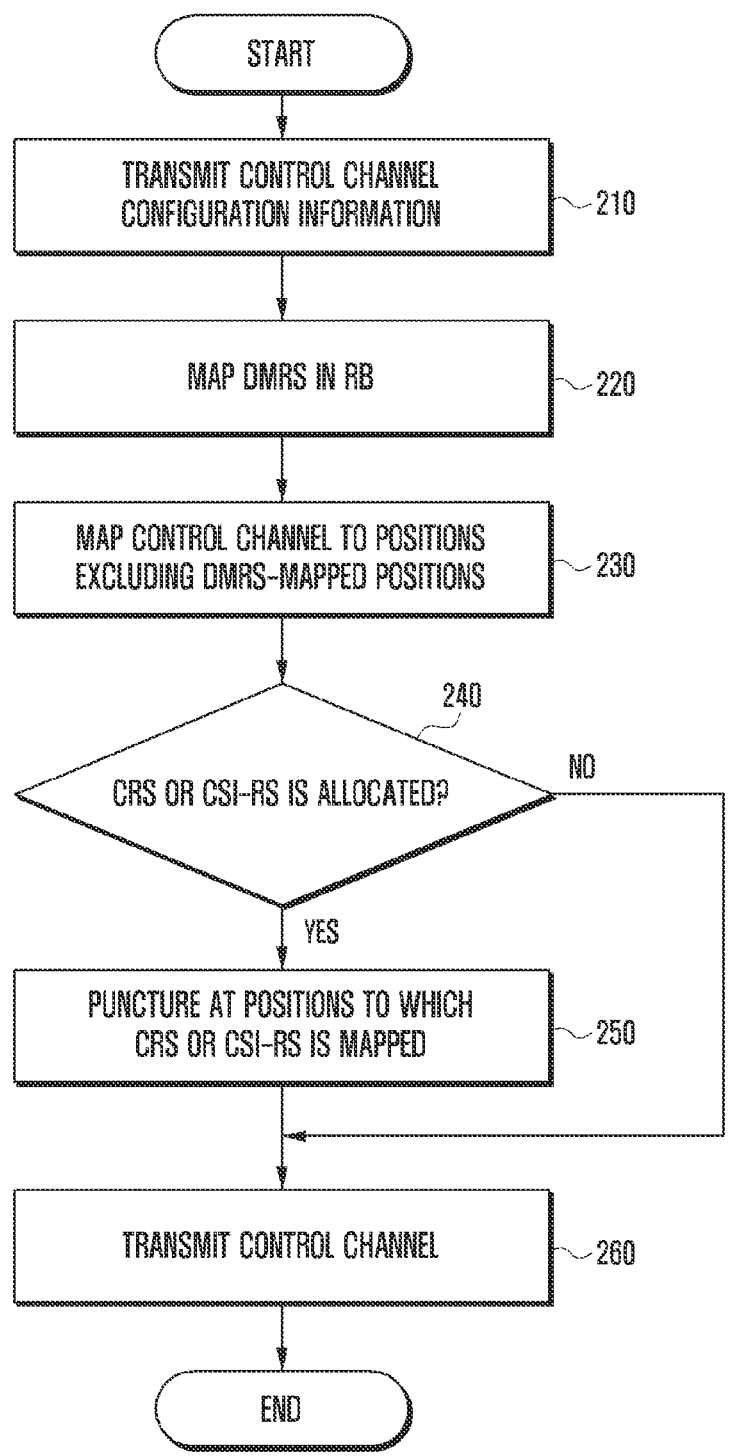
FIG. 2 is a flowchart illustrating a control channel transmission method of an eNB according to an exemplary embodiment of the present invention.

FIG. 2 is a flowchart illustrating a control channel transmission method of an eNB according to an exemplary embodiment of the present invention.

Referring to FIG. 2, the eNB sends to the UE the control channel configuration information at step 210. The configuration information can be performed through Radio Resource Control (RRC) signaling and include information on the region for control channel and a DMRS port in the resource block. In the case in which the control channel information is transmitted through a physical channel, step 210 can be omitted.

Thereafter, the eNB maps DMRS in a PRB or PRB pair at step 220.

Thereafter, the eNB maps the control channel to REs remaining after mapping the DMRS in the PRB or PRB pair at step 230. At this time, the control channel mapping is performed as shown in FIG. 1.

For example, the REs corresponding to the RB are numbered with the REG numbers, jumping the positions at which DMRS is mapped, in such a way of incrementing the subcarrier index from 0 for the REs of symbol index 0, symbol index increasing whenever all REs of a symbol are allocated completely. The eNB aggregates the REGs comprising the REs numbered with the same number to form a CCE and maps the control channel to the resource in unit CCE.

The eNB determines whether the RB includes CRS or CSI-RS at step 240.

If the eNB determines that the RB includes CRS or CSI-RS at step 240, the eNB proceeds to step 250 at which the eNB punctures the REs to which the CRS or CSI-RS is mapped. Thereafter, the eNB transmits the control channel with DMRS to the UE at step 260.

If the eNB determines that the RB does not include CRS or CSI-RS at step 240, the eNB proceeds to step 260 at which the eNB transmits the control channel with DMRS to the UE.

Figure 3:
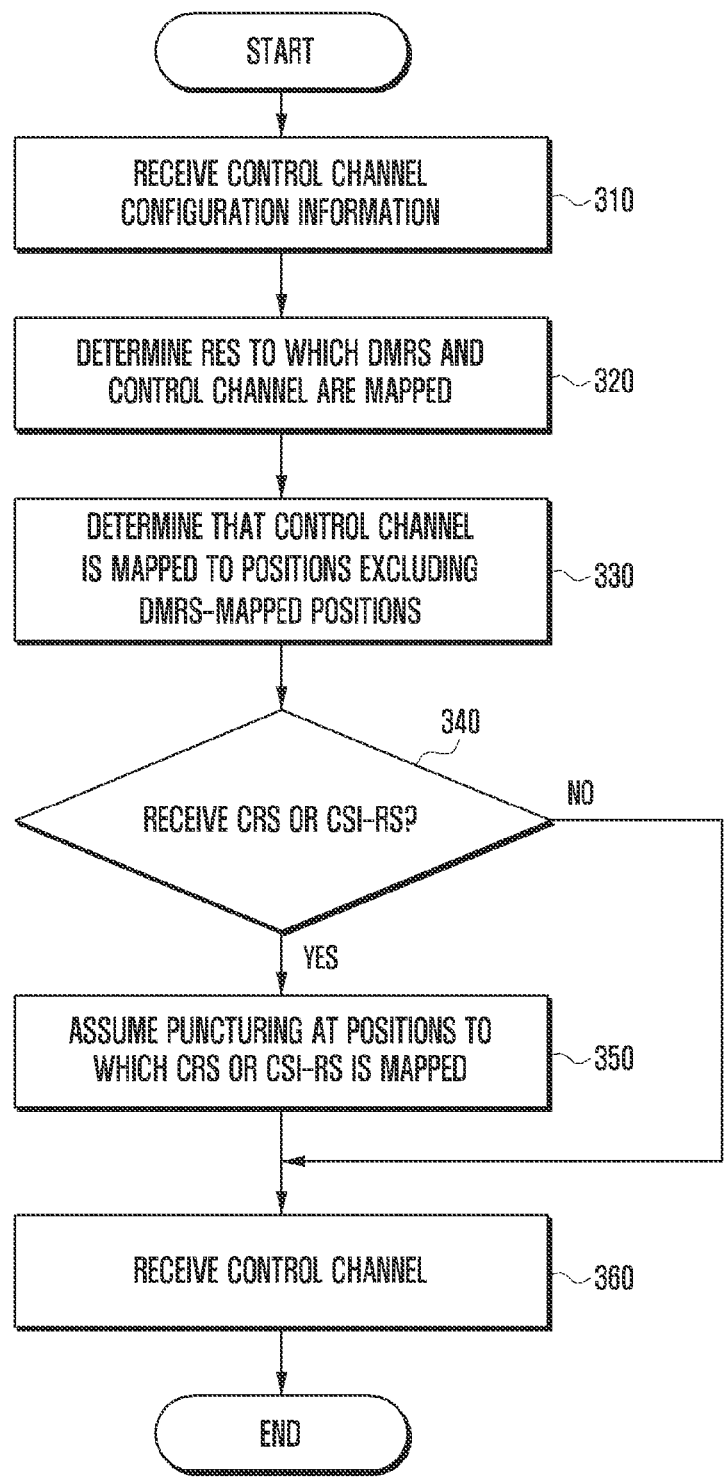
FIG. 3 is a flowchart illustrating a control channel reception method of a UE according to an exemplary embodiment of the present invention.

FIG. 3 is a flowchart illustrating a control channel reception method of a UE according to an exemplary embodiment of the present invention.

Referring to FIG. 3, the UE receives the control channel configuration information at step 310. As described above, the configuration information can be received through higher layer signaling (e.g., through RRC signaling). If the control channel configuration information is transmitted through a physical channel, step 310 can be omitted.

Thereafter, the UE determines the REs to which DMRS and control channels are mapped in the RB at step 320.

At step 330, the UE determines whether the control channel is mapped to the resource excluding the REs to which DMRS is mapped in unit of CCE according to the pattern as shown in FIG. 1.

Thereafter, the UE determines whether the RB includes CRS or CSI-RS at step 340.

If the RB is determined to include CRS or CSI-RS at step 340, the UE proceeds to step 350 at which the UE assumes that the REs corresponding to CRS or CSI-RS has been punctured. Thereafter, the UE receives the control channel with DMRS at step 360.

In contrast, if the RB is determined to not include CRS or CSI-RS at step 340, the UE proceeds to step 360 at which the UE receives control channel with DMRS.

Figure 4:
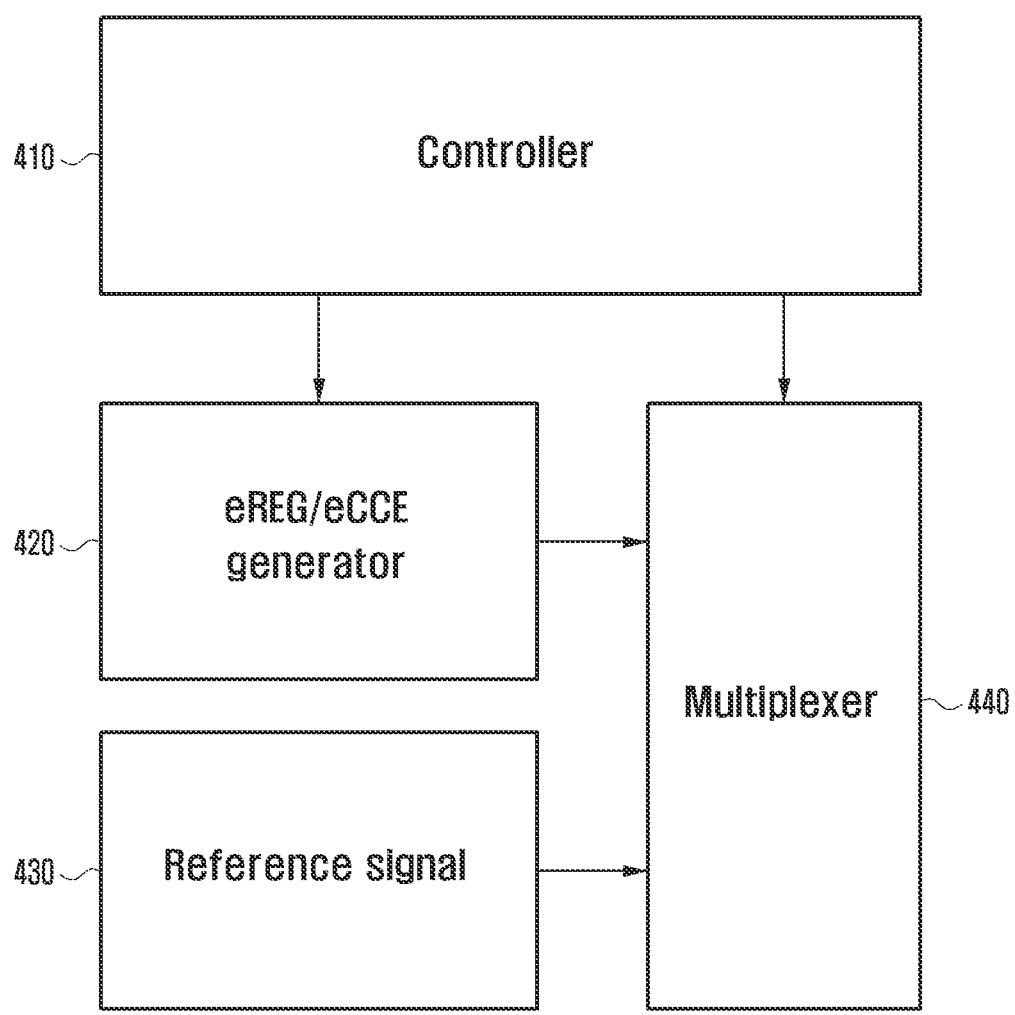
FIG. 4 is a block diagram illustrating a configuration of an eNB according to an exemplary embodiment of the present invention.

FIG. 4 is a block diagram illustrating a configuration of an eNB according to an exemplary embodiment of the present invention.

Referring to FIG. 4, the eNB includes a controller 410, an eREG/eCCE generator 420, a Reference Signal (RS) generator 430, and a multiplexer 440.

The controller 410 maps DMRS, under the assumption of 4 DMRS ports, to the eREG in the frequency-first order in PRB in order to configure the control channel to be transmitted.

The eREG/eCCE generator 420 selects PRB for transmitting the control channel and chooses eREG to configure eCCE according to an exemplary embodiment of the present invention.

The RS generator 430 generates CRS and/or CSI-RS.

The multiplexer 440 multiplexes the control channel and the CRS and/or CSI-RS. At this time, the multiplexer 430 performs multiplexing after substituting the eREG including the REs to which the reference signals are mapped.

Figure 5:
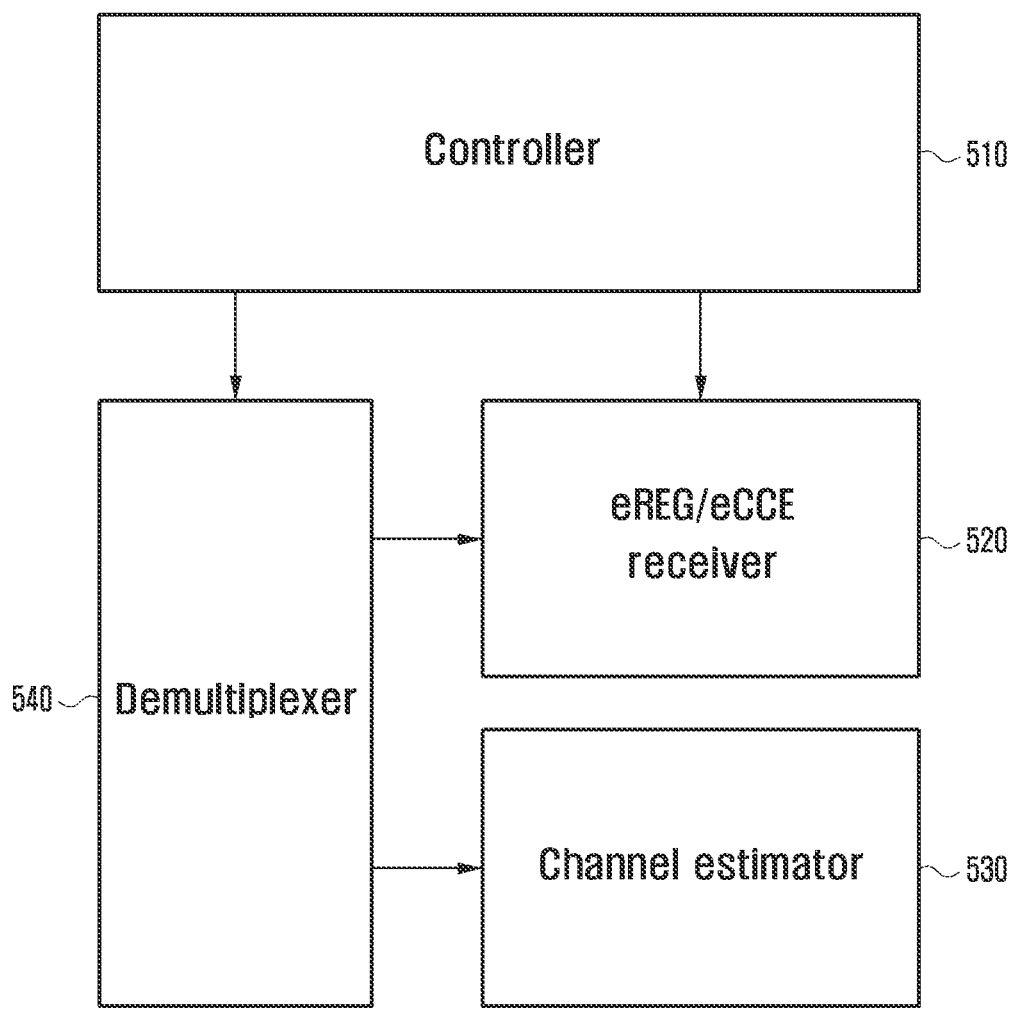
FIG. 5 is a block diagram illustrating a configuration of a UE according to an exemplary embodiment of the present invention.

FIG. 5 is a block diagram illustrating a configuration of a UE according to an exemplary embodiment of the present invention.

Referring to FIG. 5, the UE includes a controller 510, an eREG/eCCE receiver 520, a channel estimator 530, and a demultiplexer 540.

The controller 510 controls the demultiplexer 540 to demultiplex the signal received from the eNB and controls the channel estimator 530 to estimate channels with the demultiplexed CRS and CSI-RS for receiving control channel. The controller 510 controls the eREG/eCCE receiver 520 to determine the REs to which the control channel is mapped in association with eREG and eCCE regardless of the positions of CRS and CSI-RS and controls the eREG/eCCE receiver 520 to receive the control channel on the REs excluding REs corresponding to CRS and CSI-RS because the eREG and eCCE are configured in consideration of only the DMRS positions and the CRS and CSI-RS positions have been punctured.

Figure 6:
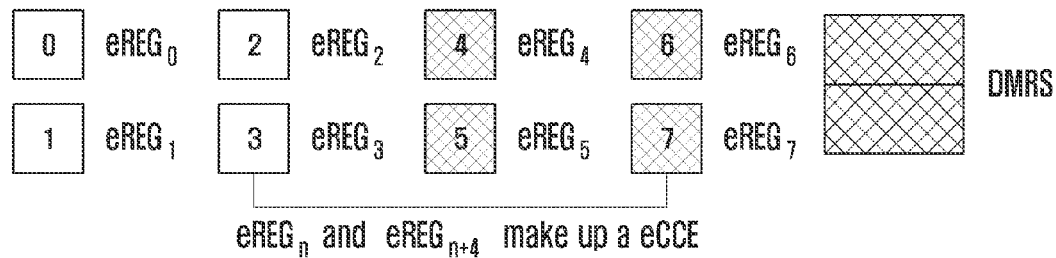
FIG. 6 is a diagram illustrating a structure of a resource block configured by shifting Control Channel Elements (CCEs) in a resource block such as, for example, the resource block of FIG. 1 on a frequency axis for use in a control channel transmission method according to an exemplary embodiment of the present invention.

FIG. 6 is a diagram illustrating a structure of a resource block configured by shifting CCEs in a resource block such as, for example, the resource block of FIG. 1 on a frequency axis for use in a control channel transmission method according to an exemplary embodiment of the present invention.

Referring to FIG. 6, as an example, PRB 1 can be configured as shown in FIG. 1 while PRB 2 as shown in FIG. 6 is configured such that the position of the CCE is not fixed but distributed across PRBs.

Hereinafter, a description is provided of exemplary embodiments of the present invention for resource allocation of the control channel in a resource block.

Figure 7:
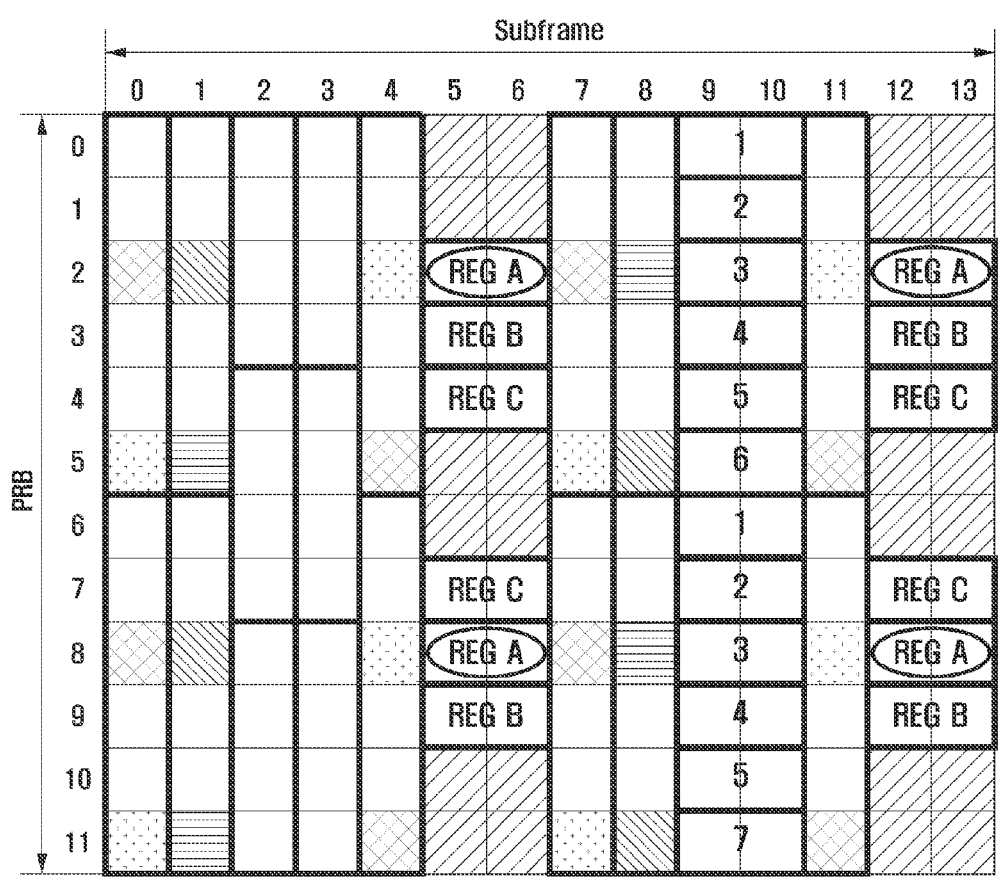
FIG. 7 is a diagram illustrating a structure of a resource block configured with Resource Element Groups (REGs) each made up of 4 Resource Elements (REs) for use in a control channel transmission method according to an exemplary embodiment of the present invention.

FIG. 7 is a diagram illustrating a structure of a resource block configured with REGs each made up of 4 REs for use in a control channel transmission method according to an exemplary embodiment of the present invention.

Referring to FIG. 7, the two RE pairs on the two subcarriers at each pair of the 5th and 6th symbols, the 9th and 10th symbols, and the 12th and 13th symbols make up one REG.

This is an arrangement in consideration of the 2-port CSI-RS positions and, if the CSI-RS is mapped to the REs numbered with 'REG A' (numbered with circle), the REG is used for CSI-RS transmission, and the control channel for the UE using the CCE including the corresponding REG is transmitted as coded and rate-matched with the exclusion of the resource as much as the REG used for CSI-RS.

In the case in which the RE pairs at the 9th and 10th symbols, four REs on the two subcarriers make up an REG. For example, the four REs numbered with the same number as shown in FIG. 6 make up an REG, and this is also configured in consideration of the 2-port CSI-RS positions. In the case of allocating the resource for control channel as shown in FIG. 7, the UE may determine a total resource amount with the exception of the region allocated for CSI-RS and negate the necessity of position change of REG due to the 2-port CSI-RS configuration and thus is advantageous in multiplexing.

Figure 8:
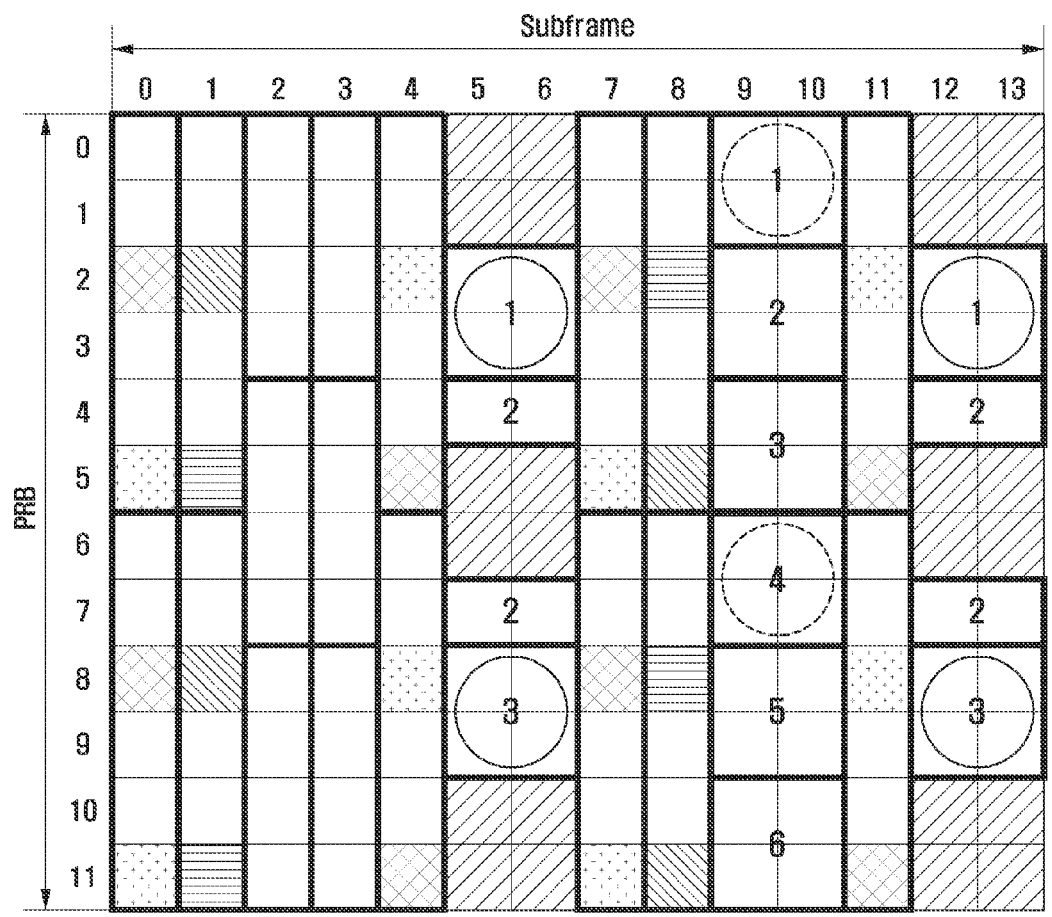
FIG. 8 is a diagram illustrating a structure of a resource block configured with REGs each made up of 4 REs for use in a control channel transmission method according to an exemplary embodiment of the present invention.

FIG. 8 is a diagram illustrating a structure of a resource block configured with REGs each made up of 4 REs for use in a control channel transmission method according to an exemplary embodiment of the present invention.

Referring to FIG. 8, the REs numbered with the same number on the two consecutive subcarriers at each pair of the 5th and 12th symbols and the 6th and 13th symbols constitute one REG.

This is an arrangement in consideration of the 4-port CSI-RS positions and, if the 4-port CSI-RSs are mapped to the REs as numbered with circle in FIG. 8, the corresponding REG is used for CSI-RS transmission, and the control channel for the UE using the CCE including the corresponding REG is transmitted as coded and rate-matched with the exclusion of the resource as much as the REG used for CSI-RS.

In the case of the REs at the 9th and 10th time symbols, if the REGs numbered with '1' and '4' numbered with dotted line circles are used for CSI-RS transmission in consideration of 4-port CSI-RS, the REs configured on two consecutive subcarriers are not used for control channel transmission.

According to exemplary embodiments of the present invention such as, for example, the exemplary embodiment of the present invention of FIG. 8, the UE rules out the region corresponding to the 4-port CSI-RS positions in determining the total resource amount so as to negate the necessity of a REG position change caused by the CSI-RS configuration, resulting in an advantage of multiplexing.

Figure 9:
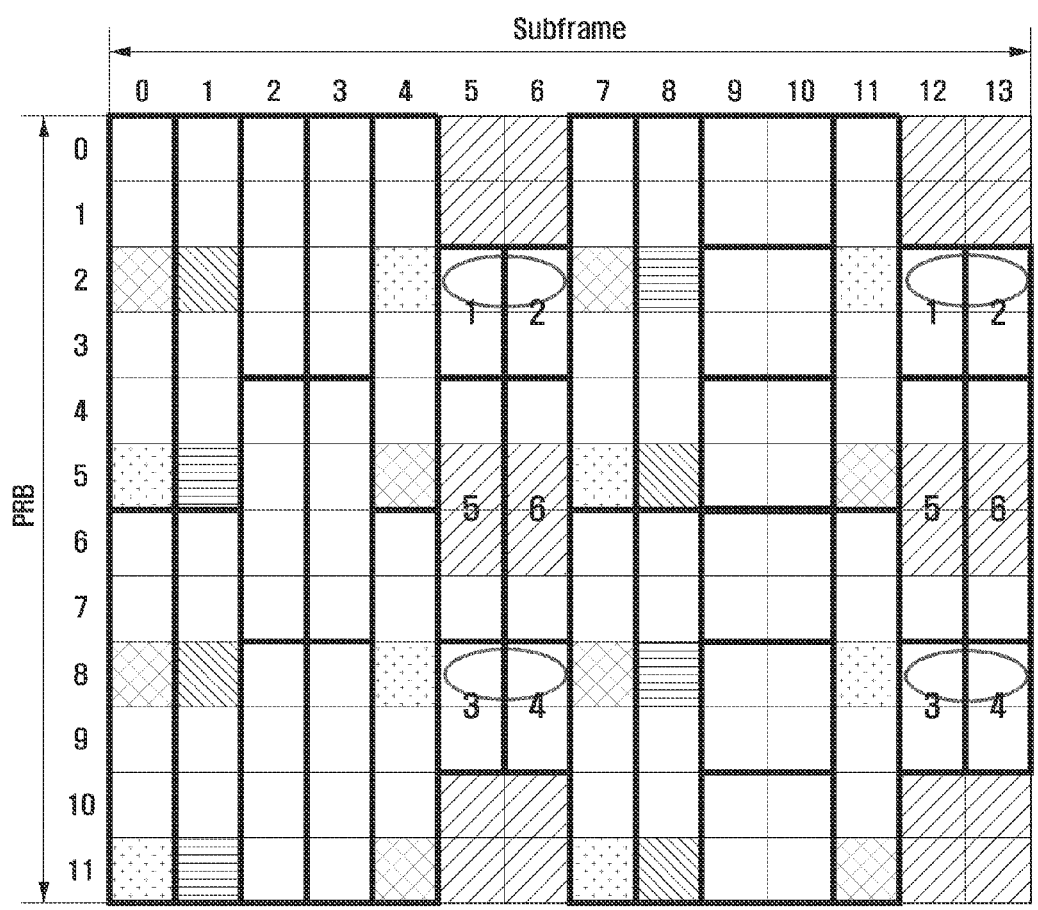
FIG. 9 is a diagram illustrating a structure of a resource block configured with REGs made up of 2 or 4 REs for use in a control channel transmission method according to an exemplary embodiment of the present invention.

FIG. 9 is a diagram illustrating a structure of a resource block configured with REGs made up of 2 or 4 REs for use in a control channel transmission method according to an exemplary embodiment of the present invention.

Referring to FIG. 9, the REs numbered with the same number on the two consecutive subcarriers at the 5th, 12th, 6th, and 13th symbols in FIG. 9 constitute an REG.

This is an arrangement in consideration of the 2-port and 4-port CSI-RS positions and, if the 2-port CSI-RSs are mapped to the resources numbered with 1, 2, 3, and 4 (e.g., the resources numbered and illustrated as having circles thereon), the corresponding REs are used for CSI-RS transmission, and the control channel for the UE using the CCE including the corresponding REG is transmitted as coded and rate-matched with the inclusion of all the resources of REG used for CSI-RS and then punctured the positions corresponding to CSI-RS and replaced the punctured region with CSI-RS.

According to exemplary embodiments of the present invention such as, for example, the exemplary embodiment of the present invention of FIG. 9, because the UE is capable of decoding and rate-matching all the control channel with the same size of CCE regardless of 2-port or 4-port CSI-RS configuration and the REs punctured for CSI-RS are identical in all CCEs, minimizing the performance difference between control channels is possible.

Figure 10:
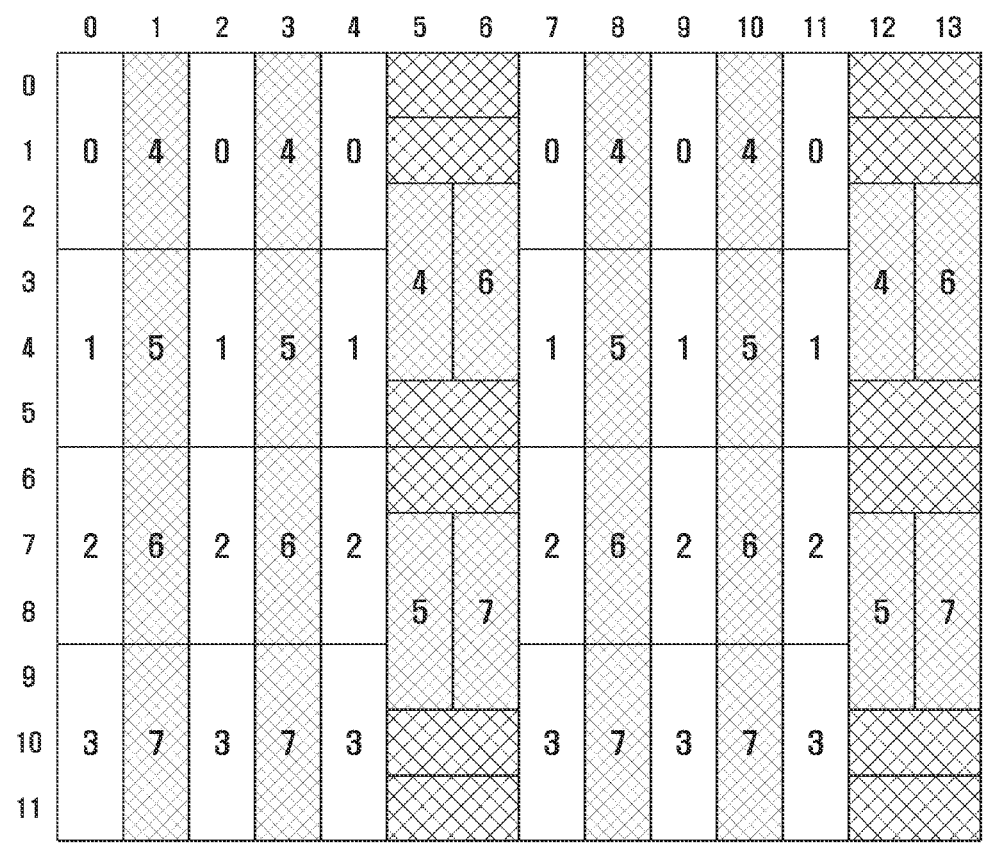
FIG. 10 is a diagram illustrating a structure of a resource block configured with REGs each made up of 3 consecutive REs for used in a control channel transmission method according to an exemplary embodiment of the present invention.
Figure 10:
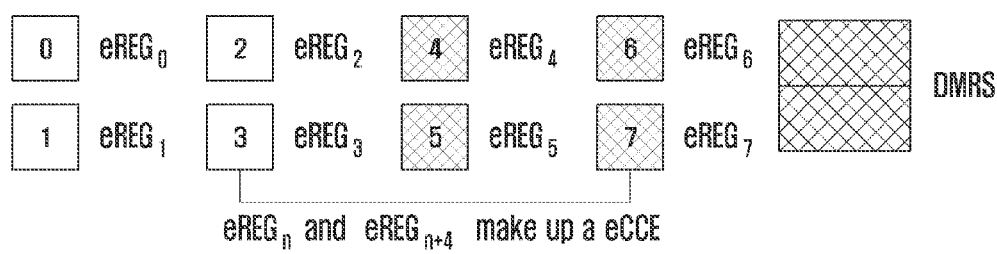

FIG. 10 is a diagram illustrating a structure of a resource block configured with REGs each made up of 3 consecutive REs for used in a control channel transmission method according to an exemplary embodiment of the present invention.

Referring to FIG. 10, the REGs are configured by taking only the DMRS positions into consideration.

In the case in which the REGs are configured in consideration of CRS in the exemplary embodiments of the present invention of FIGS. 7 to 9, if 4 CCEs are transmitted in a PRB, the REG including up to 3 or 2 CCEs, but not 4 CCEs, can be used in view of symbol. Meanwhile, in the case of REG configuration with 3 REs, up to 4 or 2 REGs can be transmitted at one symbol and thus allocation of the resource of the same CCE is possible.

In the case of configuring REGs as shown in FIG. 9, the REGs are numbered with numbers. At this time, the REGs numbered with indices at the interval of 4 constitute the same CCE. Accordingly, when configuring CCE for control channel, although the coding and rate matching are performed to the same number of REs regardless of CCE, the REGs are arranged as shown in FIG. 10. At this time, if CRS and CSI-RS are transmitted, the REs for the control channel are punctured and replaced with the CRS or CSI-RS. According to the exemplary embodiment of the present invention of FIG. 10, maintaining the same performance on the CCEs by puncturing the same amount of REs for the CRS and CSI-RS is possible.

Figure 11:
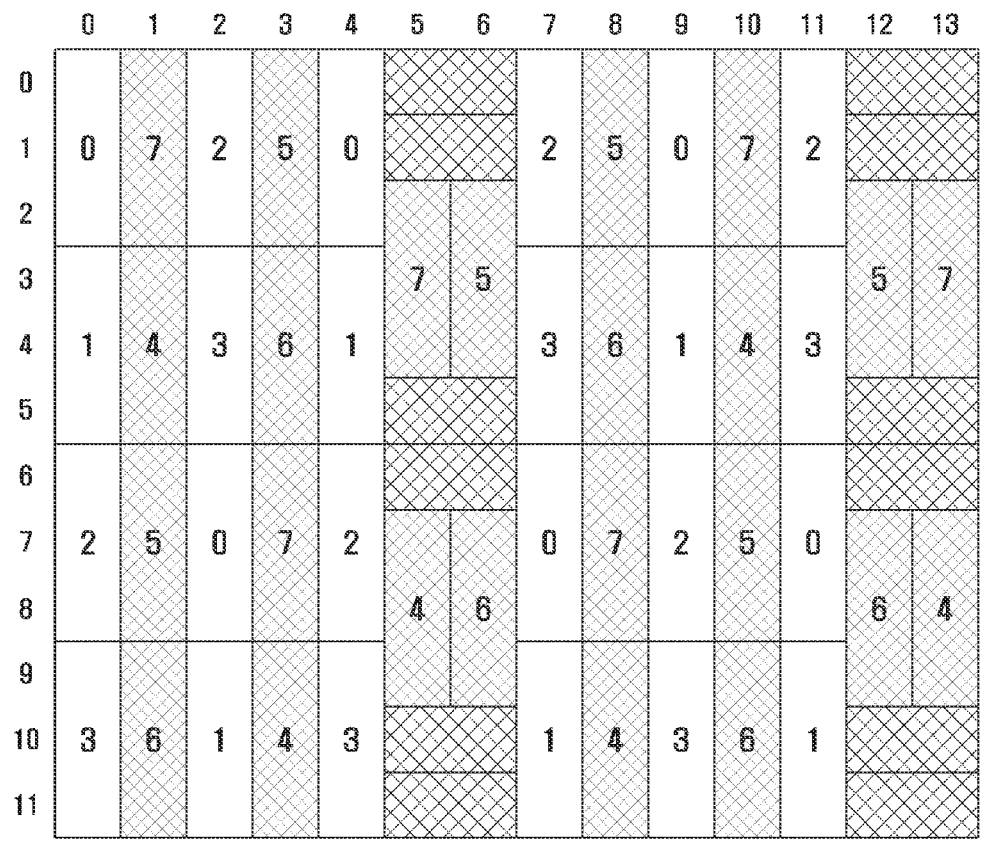
FIG. 11 is a diagram illustrating a structure of a resource block configured by shifting REGs of CCE per symbol in the configuration of FIG. 10 according to an exemplary embodiment of the present invention.
Figure 11:
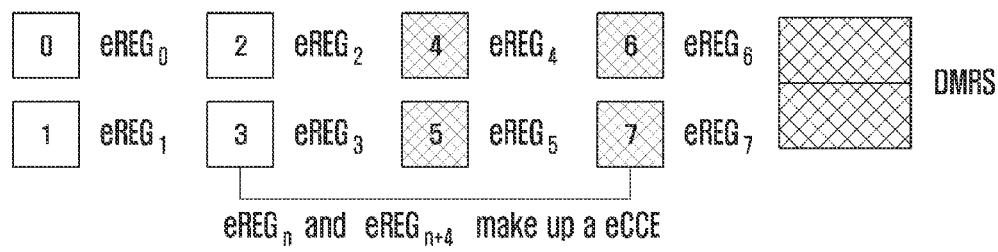

FIG. 11 is a diagram illustrating a structure of a resource block configured by shifting REGs of CCE per symbol in a configuration such as, for example, the configuration of FIG. 10 according to an exemplary embodiment of the present invention.

Referring to FIG. 11, a CCE can be distributed across the frequency band within a PRB so as to avoid the performance difference caused by the channel estimation difference between frequency bands.

Figure 12:
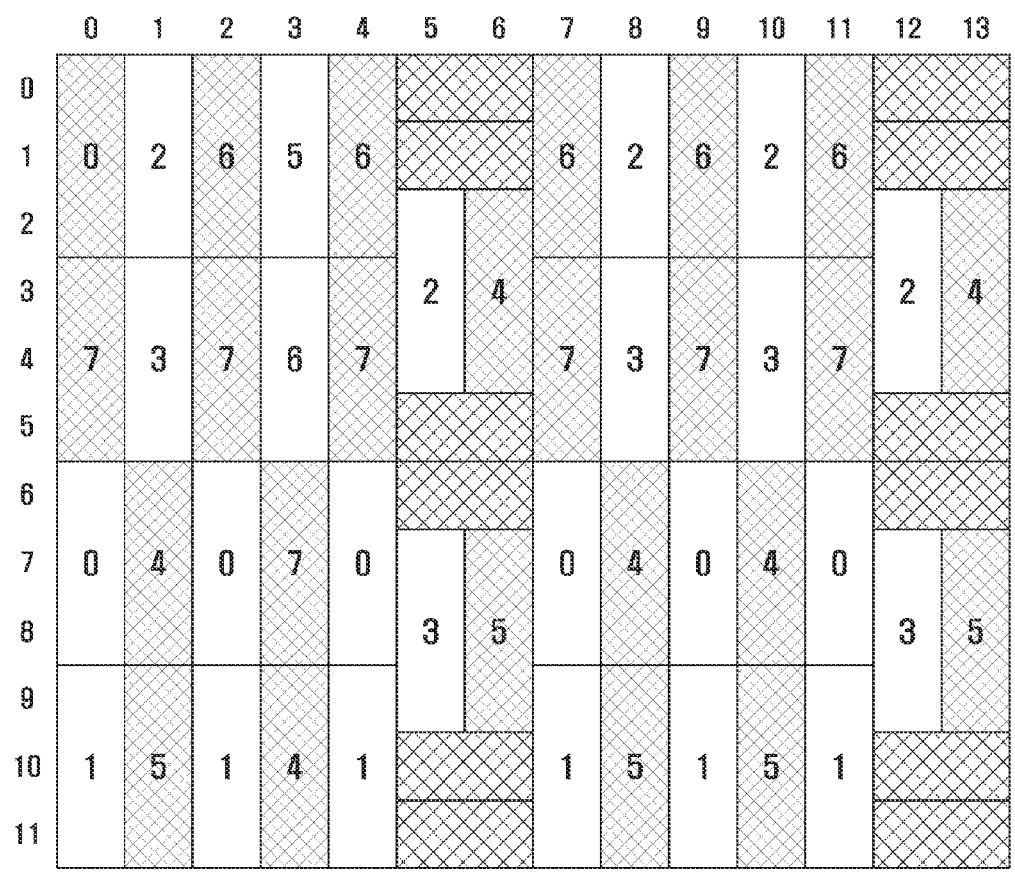
FIG. 12 is a diagram illustrating a structure of a resource block configured by shifting REGs of CCE in a configuration such as, for example, the configuration of FIG. 10 according to an exemplary embodiment of the present invention.
Figure 12:
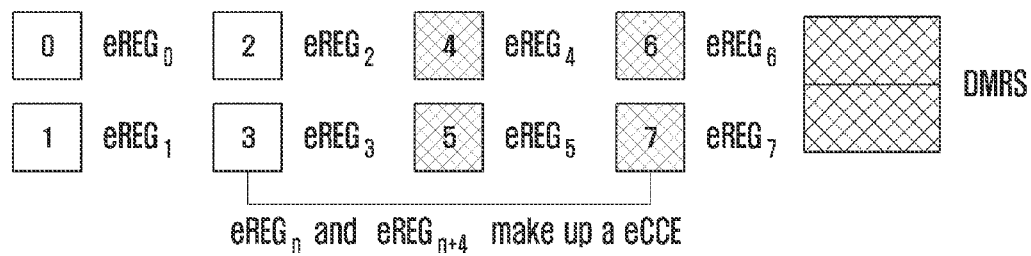

FIG. 12 is a diagram illustrating a structure of a resource block configured by shifting REGs of CCE in a configuration such as, for example, the configuration of FIG. 10 according to an exemplary embodiment of the present invention.

Referring to FIG. 12, preventing a CCE from being limited to specific region in different PRBs is possible. Thus, especially when a control channel is mapped to multiple PRBs, a performance difference caused by channel estimation difference between frequency bands may be avoided. For example, configuring PRB 1 as shown in FIG. 10 while configuring PRB 3 as shown in FIG. 12 is possible.

Figure 13:
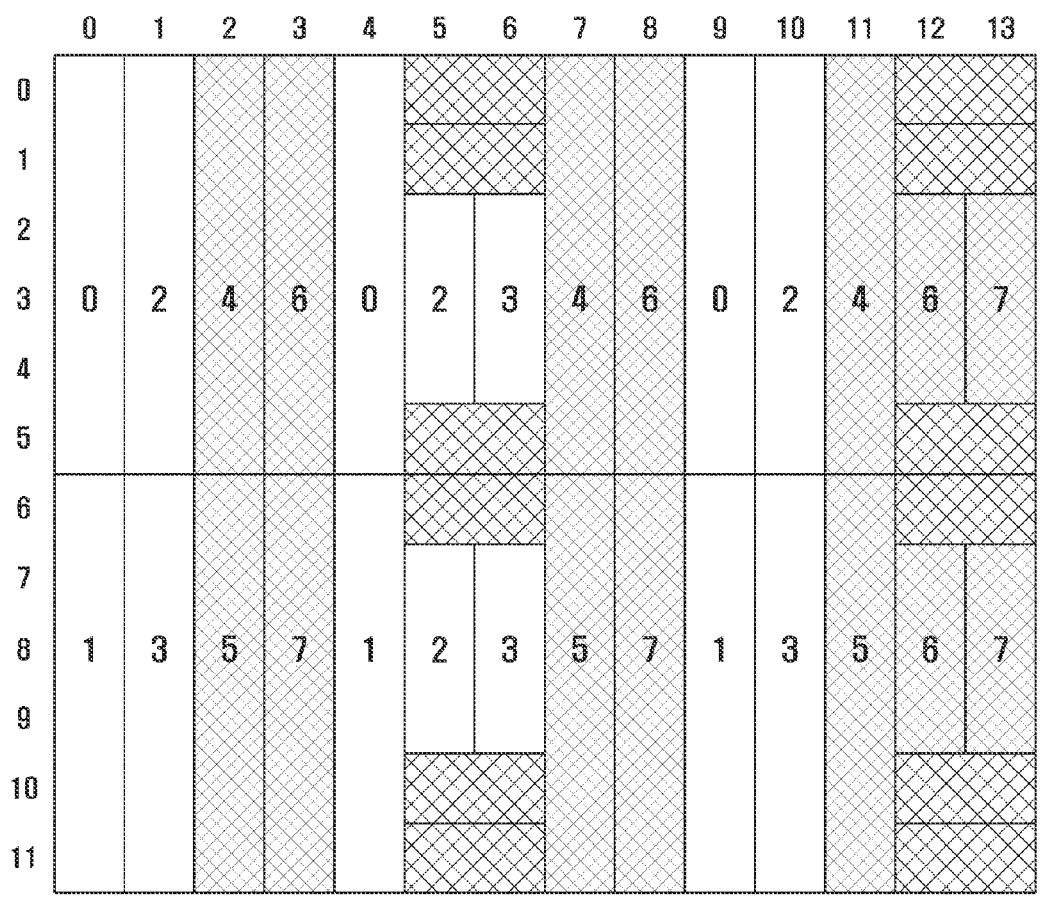
FIG. 13 is a diagram illustrating a structure of a resource block configured with REGs each made up of 6 consecutive REs for use in a control channel transmission method according to an exemplary embodiment of the present invention.
Figure 13:
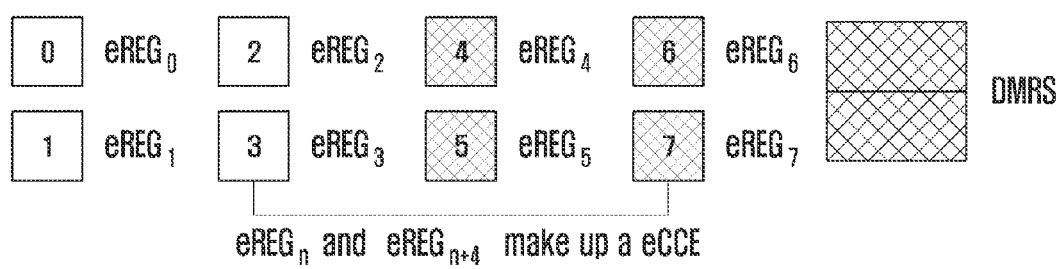

FIG. 13 is a diagram illustrating a structure of a resource block configured with REGs each made up of 6 consecutive REs for use in a control channel transmission method according to an exemplary embodiment of the present invention.

Referring to FIG. 13, in the case of configuring an REG with 6 REs, it is possible to allocate the same resource of CCE because up to 2 REGs can be transmitted across one time symbol as shown in FIG. 12. In FIG. 12, REGs are numbered with respective indices, and the REGs having the indices at the interval of 4 constitute a CCE.

Accordingly, it is possible to perform coding and rate matching to the same number of REs regardless of CCE in configuring CCEs of control channel and arrange the REGs as shown in FIG. 13. At this time, if CRS and CSI-RS are transmitted, the control channel mapped to the corresponding REs are punctured and replaced with the CRS and CSI-RS. According to the exemplary embodiment of the present invention of FIG. 13, if the control channel is punctured due to the CRS and CSI-RS, the puncturing is performed for relatively the same amount of the REs in the CCEs so as to maintain the same performance between CCEs.

Figure 14:
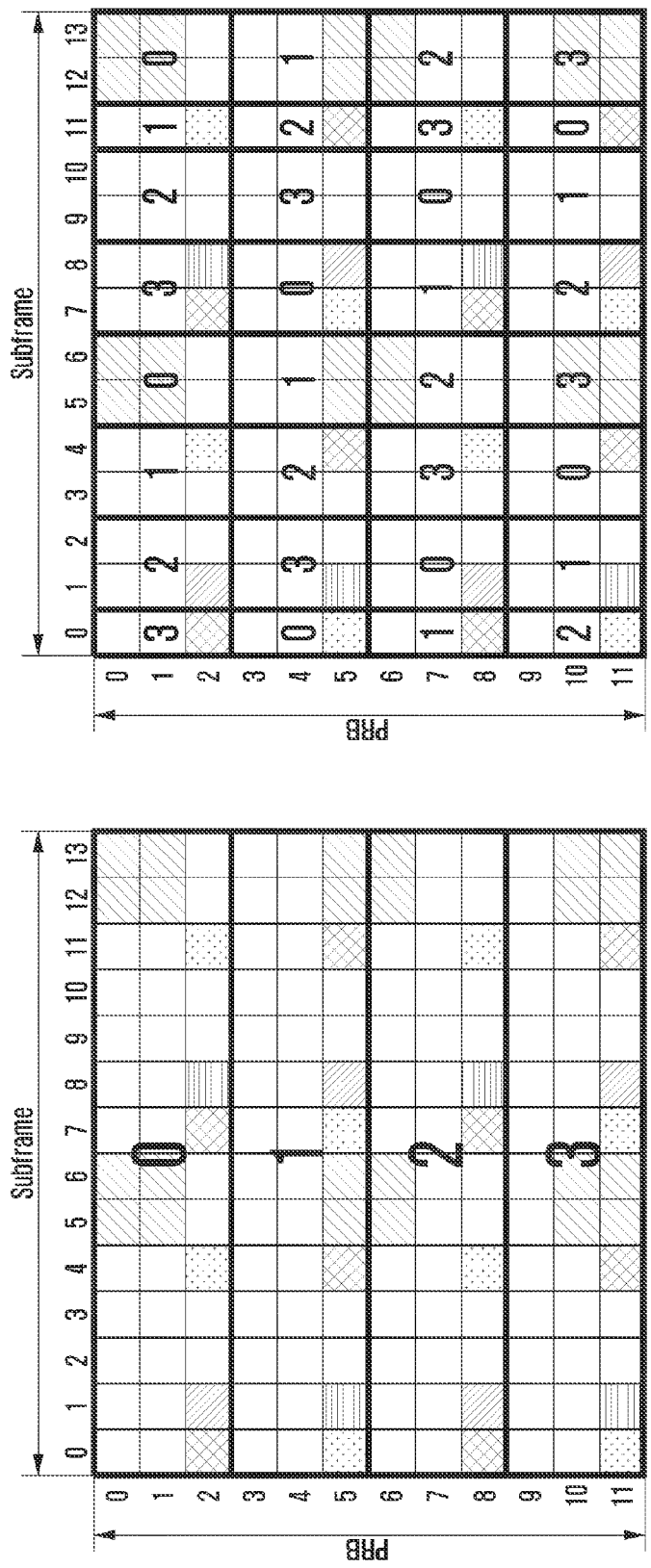
FIG. 14 is a diagram illustrating the structure of a resource block divided into four CCEs each made up of 3 consecutive subcarriers in which symbols are cyclic-shifted in unit of 3 at two or one symbol interval on a time axis as shown in a left part for use in a control channel transmission method according to an exemplary embodiment of the present invention.

FIG. 14 is a diagram illustrating the structure of a resource block divided into four CCEs each made up of 3 consecutive subcarriers in which symbols are cyclic-shifted in unit of 3 at two or one symbol interval on a time axis as shown in a left part for use in a control channel transmission method according to an exemplary embodiment of the present invention.

Figure 15:
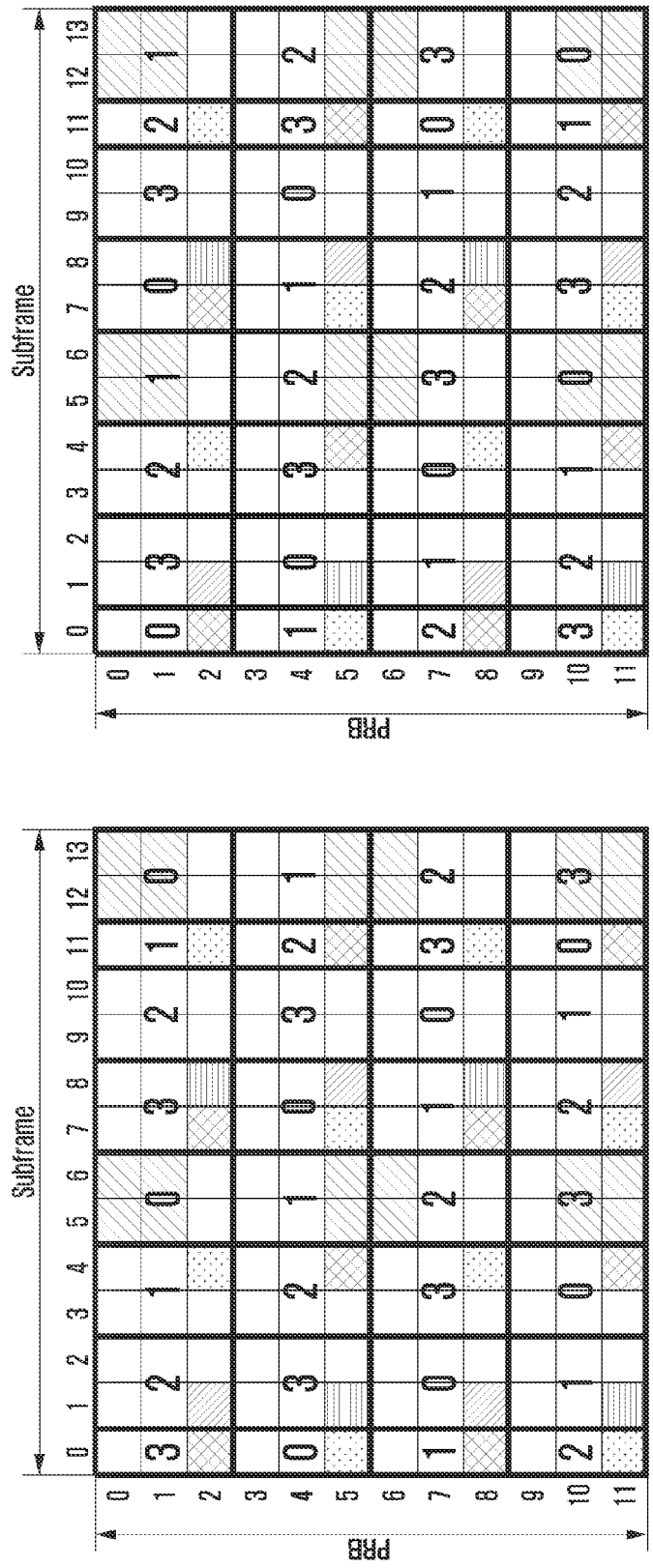
FIG. 15 is a diagram illustrating a structure of a resource block configure by applying cyclic shift to a resource block such as, for example, the resource block of FIG. 14 according to an exemplary embodiment of the present invention.

FIG. 15 is a diagram illustrating a structure of a resource block configured by applying cyclic shift to a resource block such as, for example, the resource block of FIG. 14 according to an exemplary embodiment of the present invention.

Referring to FIG. 14, it is possible to transmit one CCE across the entire PRB while the resources at the CSI-RS transmission positions of symbols 5, 6, 9, 10, 12, and 13 do not influence the CCE. This method is advantageous in performing rate matching in consideration of CSI-RS or CRS overhead.

Referring to FIG. 15, the method of FIG. 14 may apply different cyclic shifts to the PRB x and PRB y as shown in FIG. 15.

As described above, according to exemplary embodiments of the present invention, the control channel transmission/reception method and apparatus may configure REGs and CCEs to allocate the resource for control channel transmission efficiently using specific resource regions and DMRS and multiplexing the control channel to be transmitted in both the distributed and localized modes in consideration of the RS positions and overhead.

According to exemplary embodiments of the present invention, the control channel transmission/reception method and apparatus for use in the wireless communication system may arrange CCEs for control channel in similar frequency distributed manner in PRB and maintaining, when it is necessary to puncture the control channel at REs for CSI-RS and CRS, the same amount of resource to be punctured among the CCEs.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

It is to be appreciated that those skilled in the art can change or modify the exemplary embodiments without departing the technical concept of this invention. Accordingly, it should be understood that above-described exemplary embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A control channel transmission method of a base station in a wireless communication system, the method comprising:
    mapping a demodulation reference signal (DMRS) to resource elements (REs) of a resource block (RB) for transmitting a control channel;
    mapping the control channel to the REs in a frequency-first cyclically without the REs to which the DMRS is mapped; and
    transmitting the DMRS and the control channel.

2. The method of claim 1, wherein the mapping of the control channel comprising:
    mapping the control channel to a symbol of the RB; and
    incrementing a time index to continue mapping the control channel, when the control channel is mapped to all subcarriers of the RB included in the symbol of time domain, repeatedly.

3. The method of claim 1, wherein the REs are numbered with a predetermined amount of resource element group (REG) numbers cyclically.

4. The method of claim 3, wherein the REs numbered with the REG numbers at a symbol of the RB are assigned and then at another symbol by incrementing time index, repeatedly.

5. The method of claim 3, further comprising:
    configuring each of the REGs by aggregating the REs numbered with a same REG number,
    wherein the mapping of the control channel comprises aggregating the REGs assigned respective REG numbers at least one control channel element (CCE).

6. The method of claim 1, wherein the mapping of the control channel comprises puncturing at the REs to which a cell-specific reference signal (CRS) or a channel state information reference signal (CSI-RS) is mapped.

7. The method of claim 1, wherein the control channel corresponds to an enhanced physical downlink control channel (E-PDCCH).

8. A control channel reception method of a terminal in a wireless communication system, the method comprising:
    determining resource elements (REs) to which a demodulation reference signal (DMRS) is mapped in a resource block (RB) for transmitting a control channel;
    determining the REs to which the control channel is mapped in a frequency-first cyclically without the REs to which the DMRS is mapped; and
    receiving the DMRS and the control channel according to the determined REs.

9. The method of claim 8, wherein the control channel is mapped to a symbol of the RB while incrementing a time index to continue mapping the control channel, when the control channel is mapped to all subcarriers of the RB included in the symbol of time domain, repeatedly.

10. The method of claim 8, wherein the REs are numbered with a predetermined amount of resource element group (REG) numbers cyclically.

11. The method of claim 10, wherein the REs numbered with the REG numbers at a symbol of the RB are assigned and then at another symbol by incrementing time index, repeatedly.

12. The method of claim 10, further comprising:
    configuring each of the REGs by aggregating the REs numbered with the same REG number,
    wherein the mapping of the control channel comprises aggregating the REGs assigned respective REG numbers at least one control channel element (CCE).

13. The method of claim 8, wherein the determining of the REs to which the control channel is mapped comprises assuming puncture at the REs to which a cell-specific reference signal (CRS) or a channel state information reference signal (CSI-RS) is mapped.

14. The method of claim 8, wherein the control channel corresponds to an enhanced physical downlink control channel (E-PDCCH).

15. A control channel transmission apparatus of a base station in a wireless communication system, the apparatus comprising:
    a transceiver which transmits and receives signals to and from a terminal; and
    a controller which controls mapping a demodulation reference signal (DMRS) to resource elements (REs) of a resource block (RB) for transmitting a control channel, mapping the control channel to the REs in a frequency-first cyclically, without the REs to which the DMRS is mapped, and transmitting the DMRS and the control channel.

16. The apparatus of claim 15, wherein the controller maps the control channel to a symbol of the RB, and increments a time index to continue mapping the control channel, when the control channel is mapped to all subcarriers of the RB included in the symbol of time domain, repeatedly.

17. The apparatus of claim 15, wherein the REs are numbered with a predetermined amount of resource element group (REG) numbers cyclically.

18. The apparatus of claim 17, wherein the REs numbered with the REG numbers at a symbol of the RB are assigned and then in another symbol by incrementing time index, repeatedly.

19. The apparatus of claim 17, wherein the controller controls configuring each of the REGs by aggregating the REs numbered with a same REG number, and
    wherein the mapping of the control channel comprises aggregating the REGs assigned respective REG numbers at least one control channel element (CCE).

20. The apparatus of claim 15, wherein the controller controls puncturing at the REs to which a cell-specific reference signal (CRS) or a channel state information reference signal (CSI-RS) is mapped.

21. The apparatus of claim 15, wherein the control channel corresponds to an enhanced physical downlink control channel (E-PDCCH).

22. A control channel reception apparatus of a terminal in a wireless communication system, the apparatus comprising:
    a transceiver which transmits and receives signals to and from a base station; and
    a controller which controls determining resource elements (REs) to which a demodulation reference signal (DMRS) is mapped in a resource block (RB) for transmitting a control channel, determining the REs to which the control channel is mapped in a frequency-first cyclically without the REs to which the DMRS is mapped, and receiving the DMRS and the control channel according to the determined REs.

23. The apparatus of claim 22, wherein the control channel is mapped to a symbol of the RB while incrementing a time index to continue mapping the control channel, when the control channel is mapped to all subcarriers of the RB included in the symbol of time domain, repeatedly.

24. The apparatus of claim 22, wherein the REs are numbered with a predetermined amount of resource element group (REG) numbers cyclically.

25. The apparatus of claim 24, wherein the REs numbered with the REG numbers at a symbol of the RB are assigned and then in another symbol by incrementing time index, repeatedly.

26. The apparatus of claim 24, wherein the controller controls configuring each of REGs by aggregating the REs numbered with the same REG number, and
　wherein the mapping of the control channel comprises aggregating the REGs assigned respective REG numbers at least one control channel element (CCE).

27. The apparatus of claim 22, wherein the controller assumes puncture at the REs to which a cell-specific reference signal (CRS) or a channel state information reference signal (CSI-RS) is mapped.

28. The apparatus of claim 22, wherein the control channel corresponds to an enhanced physical downlink control channel (E-PDCCH).

\* \* \* \* \*